United States Patent [19]

DeLong et al.

[11] Patent Number: 5,506,680
[45] Date of Patent: Apr. 9, 1996

[54] LIQUID MERCURY OPTICAL SCINTILLATOR SYSTEM FOR SIMULATING OPTICAL ATMOSPHERIC TURBULENCE EFFECTS

[75] Inventors: Mark L. DeLong, Bellbrook; Jack H. Parker; Elizabeth A. Beecher, both of Columbus; Scott A. Milligan, Beavercreek, all of Ohio

[73] Assignee: The United States of America as represented by the Secretary of the Air Force, Washington, D.C.

[21] Appl. No.: 381,573

[22] Filed: Jan. 26, 1995

[51] Int. Cl.$^6$ ............................ G01B 11/30; G01N 17/00
[52] U.S. Cl. ............................ 356/371; 73/865.6; 73/571
[58] Field of Search ............................ 356/371; 73/865.6, 73/571, 668, 608

[56] References Cited

U.S. PATENT DOCUMENTS

| | | | |
|---|---|---|---|
| 4,833,928 | 5/1989 | Luukkala et al. | 73/862.39 |
| 4,930,352 | 6/1990 | Parker et al. | 73/662 |
| 5,091,801 | 2/1992 | Ebstein | 359/665 |
| 5,378,890 | 1/1995 | Wes et al. | 250/252.1 |

*Primary Examiner*—Frank Gonzalez
*Assistant Examiner*—Jason D. Eisenberg
*Attorney, Agent, or Firm*—Bobby D. Scearce; Thomas L. Kundert

[57] ABSTRACT

A liquid mercury optical scintillator for simulating atmospheric laser scintillation effects is described which comprises a partially bounded mercury pool, a transducer operatively connected to the the pool for coupling vibrational energy to the surface of the pool, and a detector for measuring spatial irradiance variations in a laser beam reflected from the vibrating mercury surface which variations correspond to probability distributions matching atmospheric ln-normal statistics.

7 Claims, 2 Drawing Sheets

LIQUID MERCURY OPTICAL SCINTILLATOR SYSTEM FOR SIMULATING OPTICAL ATMOSPHERIC TURBULENCE EFFECTS

RIGHTS OF THE GOVERNMENT

The invention described herein may be manufactured and used by or for thee Government of the United States for all governmental purposes without the payment of any royalty.

BACKGROUND OF THE INVENTION

The present invention relates generally to systems and methods for simulating optical atmospheric turbulence effects in a laboratory, and more particularly to a liquid mercury optical scintillator providing real-time statistical and near wavelength independent control over the spatial intensity modulation of light sources used for laboratory analysis of optical receivers.

In the prior art, proper evaluation of optical receivers requires testing both in the laboratory and the field in order to evaluate the receivers under atmospheric conditions. The conditions spatially modulate lasers used as test sources in ways that affect receiver performance. Because a need exists to enhance receiver performance, statistical behavior of atmospheric scintillation has been widely studied, resulting in a substantial data base relevant to probability distributions and power spectra of spatial and temporal distribution patterns of laser and nonlaser sources. The statistics encompass a variety of sources, atmospheric conditions and regional locale. Analyses of optical receivers under these atmospheric statistical effects require tests under specific scintillation conditions, which is a problem in that statistical control over atmospheric turbulence is not possible.

In a system described by Parker et al (U.S. Pat. No. 4,930,352 titled "Reflective Membrane Optical Scintillator", the teachings of which are incorporated herein by reference), atmospheric turbulence effects are simulated by vibrational modes of an acoustically excited tightly stretched bounded membrane which spatially modulates the intensity of collimated light reflected off its surface. Acoustic energy is coupled into the membrane through an electromechanical transducer. Audio signals presented to the transducer set up nodal vibrational modes in the membrane, which result in angular distortion areas along the surface which redirect rays of incident light and change the spatial irradiance distribution of the overall light beam. The energy redistribution statistics depend on the applied acoustical spectrum and the shape and impedance of boundary conditions imposed on the membrane. With random frequency excitation, nonstationary irradiance fluctuations simulate naturally scintillated laser light. In Parker et at, lack of vibrational damping along the hard membrane boundaries result in excess coupling of energy into resonant vibrational modes which adversely modulate the collimated light beam reflected off the membrane surface and result in multimodal probability density functions that clearly lack a ln-normal distribution envelope. Resonant modes can be significantly reduced and ln-normal statistical distributions can be achieved through tedious adjustments in acoustic driving frequencies, transducer location, membrane tension and mechanical damping along the membrane boundary; these adjustments are time-consuming and membrane-dependent. If a membrane breaks, the system must be readjusted before again producing ln normal statistical distributions.

The invention solves or substantially reduces in critical importance problems with prior art systems as just suggested by providing a liquid mercury optical scintillation system for simulating turbulence effects of optical transmission through the atmospere. In accordance with a governing principle of the invention, spatial irradiance variations in the beam reflected from a vibrating liquid mercury pool exhibit probability distributions matching atmospheric ln-normal statistics.

It is therefore a principal object of the invention to provide a system for simulating optical atmospheric effects in a laboratory.

It is a further object of the invention to provide an optical scintillator providing real-time statistical control over spatial intensity modulation of light sources used for laboratory analysis of optical receivers.

It is yet another object of the invention to provide a liquid mercury optical scintillator for simulating atmospheric effects in a laboratory.

These and other objects of the invention will become apparent as a derailed description of representative embodiments thereof proceeds.

SUMMARY OF THE INVENTION

In accordance with the foregoing principles and objects of the invention, a liquid mercury optical scintillator for simulating atmospheric laser scintillation effects is described which comprises a partially bounded mercury pool, a transducer operatively connected to the the pool for coupling vibrational energy to the surface of the pool, and a detector for measuring spatial irradiance variations in a laser beam reflected from the vibrating mercury surface which variations correspond to probability distributions matching atmospheric ln-normal statistics.

DESCRIPTION OF THE DRAWINGS

The invention will be more clearly understood from the following detailed description of representative embodiments thereof read in conjunction with the accompanying drawings wherein.

DETAILED DESCRIPTION

In accordance with a governing principle of the invention, collimated light reflected off a partially bounded liquid mercury surface is spatially modulated in a way that simulates effects observed over long path propagation through the atmosphere. Energy coupled into the mercury through an electro-mechanical transducer excites turbulent vibrations in the mercury which produce angular distortion areas that redistribute energy in the reflected beam, the redistribution statistics being dependent on the applied energy spectrum, light beam angle of incidence, equivalent path lo length working distance and shape and texture of the container.

Figure 1:
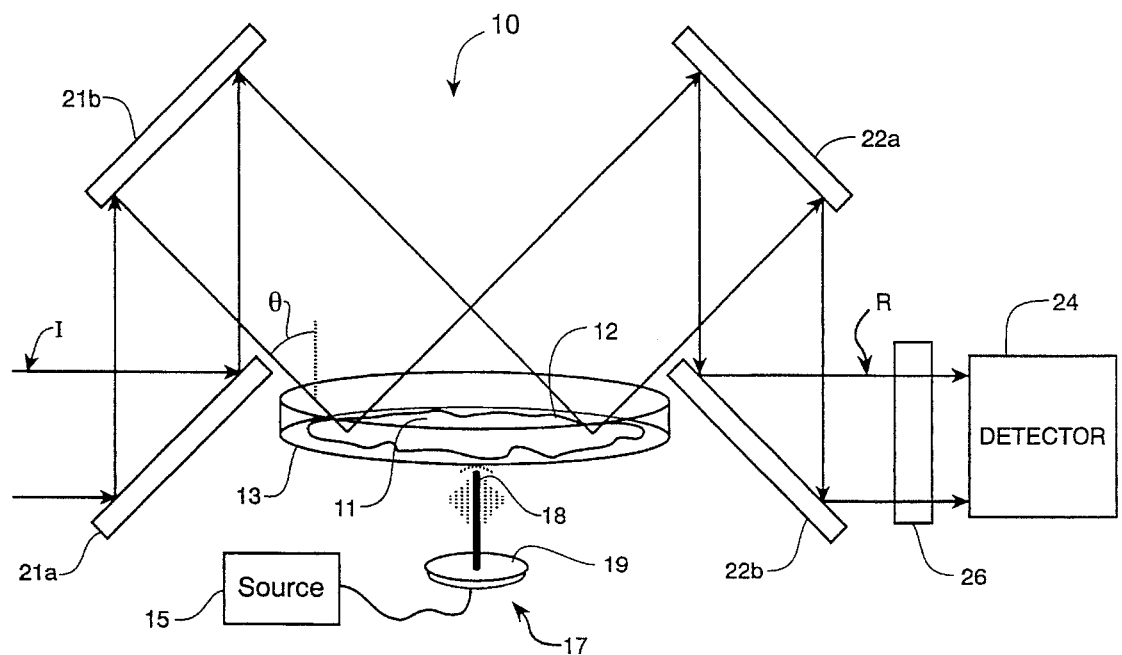
FIG. 1 shows schematically the essential component parts of a representative embodiment of the invention.

Referring now to the drawings, FIG. 1 is a drawing of the component parts of scintillator device 10 comprising a representative embodiment of the invention. Pool 11 of liquid mercury is contained in a suitable container 13. Mercury was selected as the scintillation medium because it is characterized by high reflectivity over a broad spectrum of wavelengths and by high surface tension and low viscosity providing suitably high mechanical coupling efficiency. Because mercury vapor is toxic and reactive with several common compounds (e.g., ammonia, boron, chlorine dioxide, nitric acid), container 13 is preferably hermetically sealed. Complete wavelength independence is therefore affected by transmission characteristics of container 13, but this effect may be minimized by using a container 13 comprising optical material such as fused quartz, PYREX™, COREX™ or NOMEX™, having a wide spectral bandwidth. Source 15 of statistical band filtered white electrical noise drives electro-mechanical transducer 17 (ATH-910, Audio Technica Headphone Coil, 20—20 KHz) for coupling energy into pool 11 and generating turbulent oscillations in surface 12. Transducer 17 may be any suitable type as would occur to the skilled artisan practicing the invention, such as a headphone coil, loudspeaker driver or solenoid coil. In the FIG. 1 embodiment, push-rod 18 energized by headphone coil 19 may directly contact container 13 and impart mechanical energy into pool 11. Uniform intensity, collimated laser beam I (optionally coherent) is directed onto surface 12 of pool 11 at angle $\theta$ as through any suitable arrangement of optics, such as represented by mirrors <a,<b. Reflected beam R is spatially modulated by oscillations in surface 12 and is directed through a second arrangement of optics, represented by mirrors >a,>b, which translates beam R to a convenient horizontal propagation mode. The spatial energy distribution within beam R is dependent on the applied transducer 17 energy spectrum, angle $\theta$ and the boundary surface 12 conditions determined by the shape and texture of container 13. In order to prevent forced resonant modes in the vibrating surface 12, pool 11 was partially bounded on the bottom and partially on the side by a glass petri dish. The free-flowing edge and characteristic high surface tension of pool 11 promotes small turbulent random fluctuations that produce the ln-normal irradiance fluctuations observed by a silicon PIN detector 24 (PIN-10D, United Detector Technology, variable aperture 3–10 mm diam) onto which reflected beam R is directed. Spanning the audio range, the vibration frequency spectrum from source 15 is controlled via filtering of electronic white noise used to drive the transducer.

Owing to the high surface tension/low viscosity of liquid mercury, disturbances at surface 12 responsible for energy redirection are small and may generate a scintillated beam profile with a scale smaller than that of the atmosphere. Secondary optics >a,>b may therefore be configured to direct reflected beam R into beam expander 26, allowing for variable pathlength working distances from surface 12. Secondary optics represented by mirrors >a,>b may also be configured to recollimate beam R to better simulate far-field angle of arrival statistics while maintaining the same spatial redistribution pattern in irradiance. Beam expander 26 accelerates the natural divergence of the laser and allows arbitrary magnification, which is equivalent to allowing beam R to diverge naturally over an arbitrary pathlength and measuring the statistics at that distance.

Figure 2:
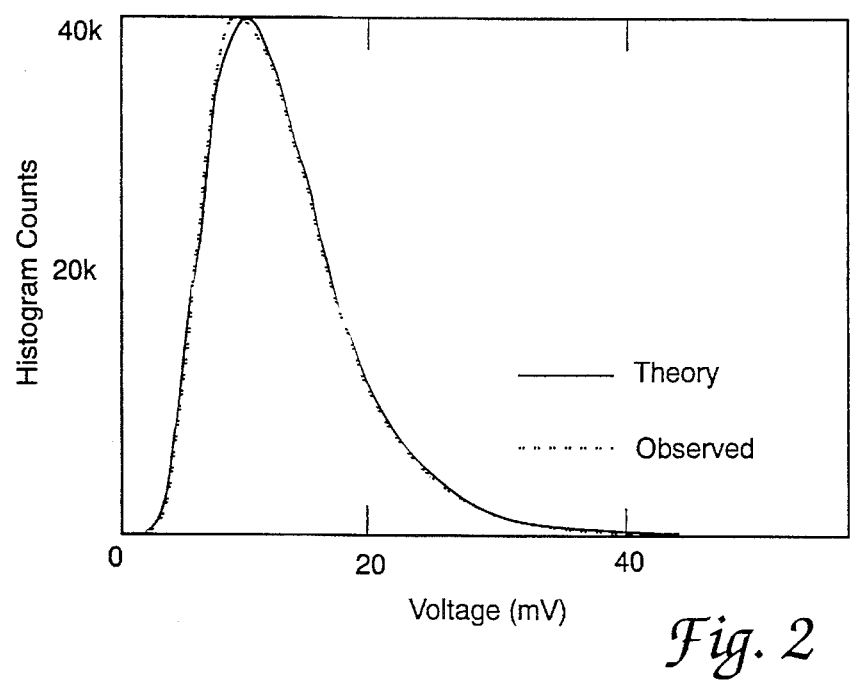
FIG. 2 is a graph of data showing ln-normal behavior of the FIG. 1 embodiment.

Tests on device 10 confirmed that probability distribution functions in beam R are substantially ln-normal and follow natural scintillation effects. Distribution functions were measured by collecting histograms of the intensity fluctuations as a function of detector 24 aperture size and fitting data to known distribution models. Equivalent pathlength distance was 100 meters, detector 24 aperture was $\leq 5$ mm diameter and the scintillation pattern was about 20×50 cm at the measurement site. Measurements were performed at various spatial locations within the enlarged scintillated field and at various detector aperture sizes. Chi-square null-hypothesis statistical tests show that in almost all cases ln-normal distributions best match the acquired data with a significance level of about 0.10 $\alpha$ as suggested by the experimental data and theoretical distributions shown in FIG. 2. Device 10 was also used to generate ln-normal distributions with variances, which simulate various degrees of atmospheric turbulence.

Figure 3:
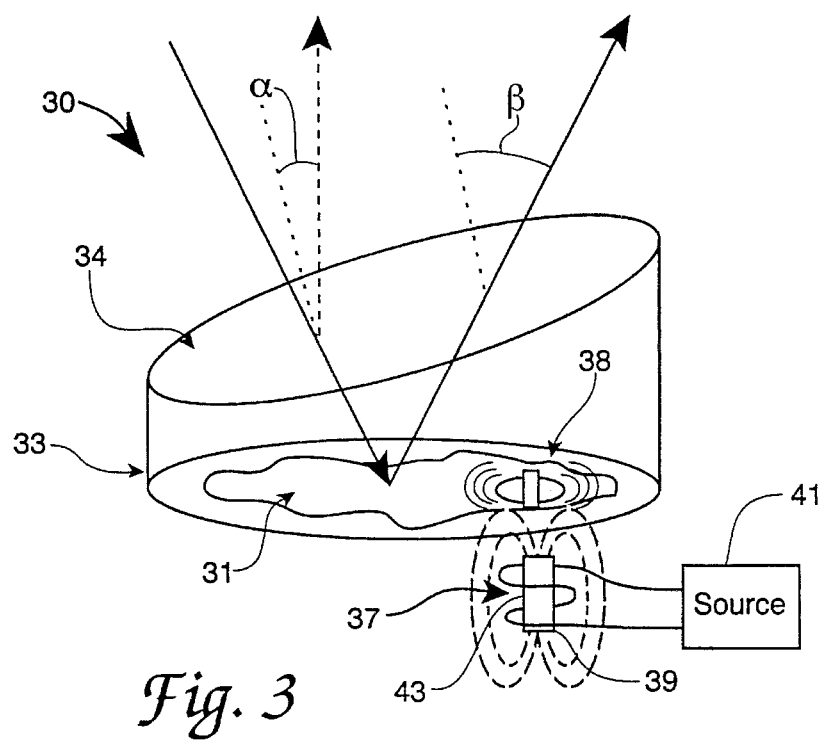
FIG. 3 shows schematically the essential component parts of a second embodiment of the invention.

Referring now to FIG. 3, shown schematically therein are the essential component parts of scintillator device 30 comprising a second embodiment of the invention. In device 30, glass container 33 with canted top surface 34 and sympathetically driven magnetic transducer 37 couples vibrational energy into mercury pool 31. Canted top 34 separates unmodulated surface reflections from the modulated laser beam, thus increasing the light/dark contrast in the scintillated field, which enhances the statistical variance dynamic range. Direct mechanical contact between a (glass or TEFLON® coated ferrous material) magnetic stirrer 38 and pool 31 substantially maximizes energy coupling efficiency and control over surface vibration behavior. In the FIG. 3 embodiment, transducer 37 included electromagnetic solenoid 39 activated by source 41 of statistical electronic noise for driving stirrer 38 to produce the desired acoustic vibrations. Solenoid 39 included a ferrite rod 43 (0.5 inch diam ×3.75 inch long; relative permeability ~800; mfgd by Amidon Assoc.) composed of manganese-zinc-ferrite or nickel-zinc-ferrite wrapped with 145 turns of 24 gauge copper magnet wire, configured for low frequency (1 kHz) operation. Because an audio amplifier was used with source 41 to modulate transducer 37, an 8-ohm impedance was desired. Other solenoid configurations and mass, composition, shape, orientation and movement constraints of the matching stirrer 38 may be selected within the scope of these teachings and of the appended claims to meet specific impedance matching and frequency bandwith requirements for a specific application, the specific structure described herein not being considered limiting of the invention.

Figure 4:
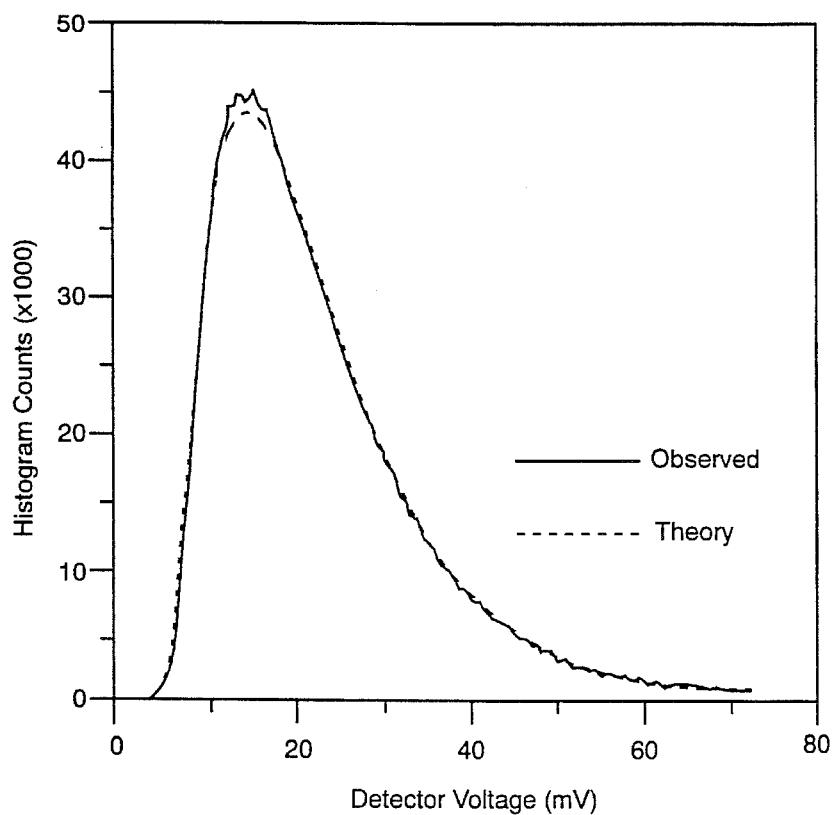
FIG. 4 is a graph of data showing ln-normal behavior of the FIG. 3 embodiment.

Device 30 was used to generate ln-normal statistics in a scintillated laser beam, as suggested by the theoretical and observed histogram distributions shown in FIG. 4. Chi-square null-hypothesis statistical tests show that ln-normal distributions best match observed data with a significance level of about 0.1 $\alpha$, which corresponds to a 99% confidence level in the ln-normal distribution statistical match. Device 30 proved to be desirably robust, and histogram distributions are typically near ln-normal regardless of where stirrer 38 is located.

The invention therefore provides a liquid mercury optical scintillator. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. An optical scintillation system for simulating optical atmospheric turbulence effects, comprising:

(a) a pool of mercury having an upper surface defined thereon;

(b) container means for supporting said pool of mercury;

(c) transducer means operatively connected to said container means and said pool of mercury for coupling vibrational energy to said surface of said pool of mercury;

(d) a source of light and optical means for directing a collimated light beam onto said surface of said pool of mercury and a reflected light beam from said surface; and (e) a detector for measuring spatial irradiance variations of said reflected light beam from said surface of said pool of mercury.

2. The system of claim 1 wherein said container means comprises an optical material selected from the group consisting of fused quartz, PYREX™, COREX™ or NOMEX™.

3. The system of claim 1 wherein said transducer means comprises a headphone coil, loudspeaker driver or solenoid coil.

4. The system of claim 1 further comprising a source of electronic noise for driving said transducer means.

5. The system of claim 1 further comprising optical means for recollimating and expanding said reflected light beam.

6. The system of claim 1 further comprising a magnetic stirrer within said pool of mercury and wherein said transducer means is operatively connected to said magnetic stirrer for controllably driving said magnetic stirrer for coupling vibrational energy to said surface of said pool of mercury.

7. The system of claim 1 wherein said source of light is coherent.

* * * * *